United States Patent [19]
Hill, III et al.

[11] Patent Number: 5,313,994
[45] Date of Patent: May 24, 1994

[54] SOLID RUBBER WHEEL AND TIRE ASSEMBLY WITH ANGLED CROSS BARS

[75] Inventors: Giles A. Hill, III; Giles A. Hill, Jr., both of Idabel, Okla.; Duane S. Birdsong, DeQueen, Ark.

[73] Assignee: Southeast Tire Company, Idabel, Okla.

[21] Appl. No.: 884,425

[22] Filed: May 15, 1992

[51] Int. Cl.$^5$ .............................. B60C 7/08; B60C 7/24
[52] U.S. Cl. .................................. 152/323; 152/301; 152/303; 152/307
[58] Field of Search .............. 152/246, 300, 301, 302, 152/303, 305, 306, 307, 323, 310, 393, 394, 379.3

[56] References Cited

U.S. PATENT DOCUMENTS

| | | | |
|---|---|---|---|
| 859,078 | 7/1907 | Kempshall | 152/310 |
| 1,104,783 | 7/1914 | Drabold et al. | 152/310 |
| 1,246,756 | 11/1917 | Kitterman | 152/306 |
| 1,263,947 | 4/1918 | Shomer et al. | 152/310 |
| 1,264,957 | 5/1918 | Mitchell | 152/379.3 |
| 1,301,230 | 4/1919 | Cooper | 152/302 |
| 1,399,180 | 12/1921 | Bailey et al. | 152/318 |
| 1,424,134 | 7/1922 | Litchfield | 156/112 |
| 1,544,639 | 7/1925 | Fowler | 152/310 |
| 2,083,766 | 6/1937 | Wittkopp | 152/379.3 |
| 2,709,471 | 5/1955 | Smith et al. | 152/310 |
| 2,882,950 | 4/1959 | Grove | 152/302 |
| 2,896,687 | 7/1959 | Smith et al. | 152/310 |
| 2,955,637 | 10/1960 | Hartzmark | 152/397 |
| 3,018,809 | 1/1962 | Bernard | 152/41 |
| 4,966,212 | 10/1990 | Hill | 152/302 |
| 5,053,095 | 10/1991 | Hill | 156/112 |

Primary Examiner—Michael W. Ball
Assistant Examiner—Francis J. Lorin
Attorney, Agent, or Firm—John W. Montgomery

[57] ABSTRACT

A wheel and solid rubber tire comprising a circular mounting disk having an axis perpendicular through the center of the circular disk. A wheel rim is rigidly affixed circumferentially around the mounting disk and has a cylindrical surface extending from one end of the rim to another and, axially aligned about the axis of the mounting disk. Multiple angled cross ribs having top and bottom edges rigidly affixed at the bottom edges to the cylindrical surface of the wheel rim substantially continuously thereacross at an angle from one end of the rim to the other and evenly spaced circumferentially therearound. One or more base layers of even thickness rubber are bonded to the cylindrical surface interposed between the angled cross ribs, and multiple additional layers of even thickness rubber are bonded to the one or more base layers with each additional layer bonded to the next so that a solid rubber tire is formed which is directly bonded to the wheel rim.

12 Claims, 2 Drawing Sheets

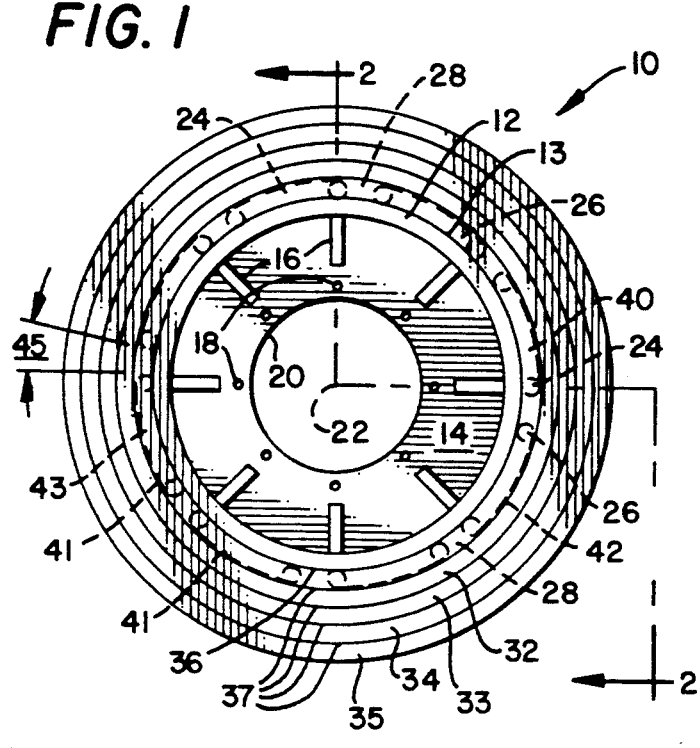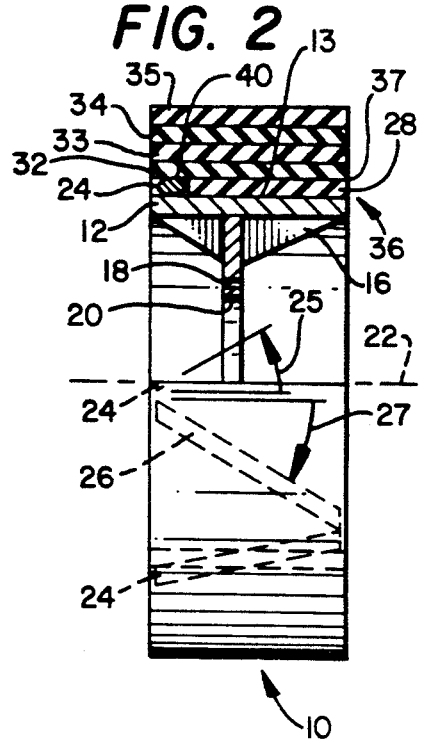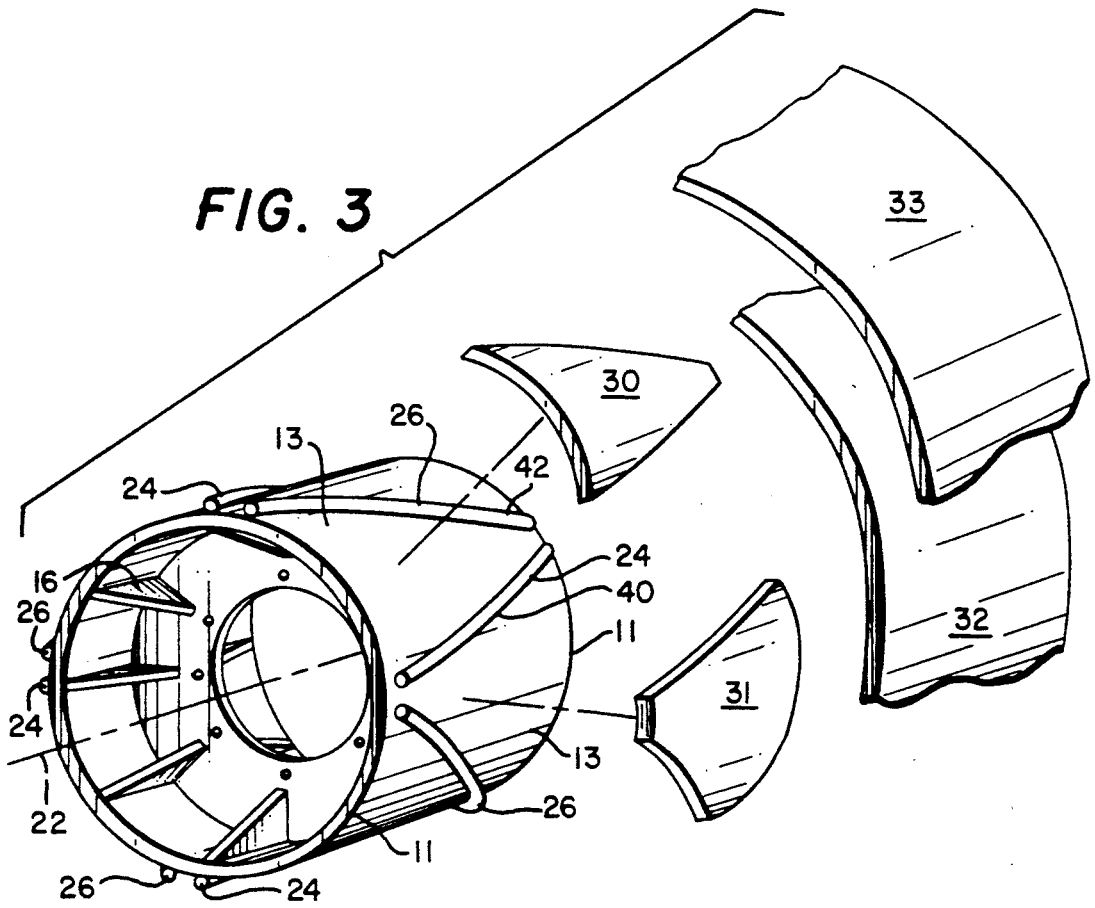

SOLID RUBBER WHEEL AND TIRE ASSEMBLY WITH ANGLED CROSS BARS

TECHNICAL FIELD OF THE INVENTION

The present invention relates to a solid rubber tire and a wheel assembly and method of construction, and particularly to a solid rubber tire bonded directly to a wheel rim having angled cross ribs formed circumferentially therearound for securely and smoothly driving the solid rubber tire with the wheel rim.

BACKGROUND OF THE INVENTION

Heavy rolling equipment is used in construction industries and in the underground mining industries. Substantial time, expense, and loss of production can result from punctured pneumatic tires used on such equipment. In some instances, standard pneumatic tires have been filled with fluid rubber, elastomeric or urethane foam materials which solidify in the tire to avoid flats and down time associated with repairing and reinflating the tires. This has not been found to be totally satisfactory because the standard pneumatic tires have a very large capacity for such elastomeric foam or solidifying rubber, so that the weight of such tires is substantially increased. Also, it has been found that such foam-filled tires nevertheless deteriorate quickly under heavy loading conditions, which results in breakage and cracking of the foam and chunking of the tire tread. The increased weight inside of the tires increases the wear and tear on both the tire and the equipment.

Solid rubber tires have been used in lighter vehicles in the past and considerable effort has been expended in attempting to avoid slippage of such solid rubber tires on the wheel rims. For example, a solid rubber tire disclosed in U.S. Pat. No. 1,301,230 issued to Cooper, has layers of rubber belts mechanically secured one layer to the next through brads and to the rim through radially extending spring-loaded bolts having enlarged heads to hold the multiple layers inward toward the rim. The bolts also tend to reduce circumferential slippage with respect to the rim. The bolts can result in uneven support pressure in the tire so that bumping will occur on a heavy loaded tire.

U.S. Pat. No. 2,882,950 issued to Grove, discloses a solid rubber tire for use with heavy rolling equipment around mines, construction jobs, and lumber camps. Reinforcing U-bolts are formed into solid rubber tires radially spaced and extending laterally across the tire just below the exterior surface and down each side where the bolts are secured to upwardly projecting side rim portions. These bolts also result in an uneven load carrying capabilities as it rolls from bolt, to rubber, to bolt repeatedly.

More recent improvements in the construction of wheels and tire assemblies with solid rubber tire for use on heavy construction equipment have been disclosed in U.S. Pat. Nos. 4,966,212 and 5,053,095 issued to Hill. These patents disclose a wheel and tire assembly which provides a large metal cylinder having side rims extending therearound and welded cross bars evenly spaced around the circumference of the rim surface and extending laterally between the side rim portions. These wheel and solid rubber tire assemblies provide substantial advantages over previously existing solid rubber tires. The cross bars are well below the tire surface to reduce the bumping effect of the lateral cross bars. However, although the type of bumping and uneven rolling which was associated with the U-bolts of Grove was substantially reduced while maintaining durability, it has been found that under extreme high pressure loading of low profile solid tires, such as that found in underground mining equipment, a certain amount of unevenness of the tire support occurs and some bumping results. Further, the in constructions where rectangular cross bars are used, such bars may present disposed sharp corners along a relatively short lateral top edge against which the rubber is compressed under heavy loading.

In each instance above, the increased pressure at the support bolts or bars, also accelerates tire deterioration. Further, previous solid tires relied upon side rim portions extending upward from the wheel rim to reduce side-to-side or axial slippage of the tires. Bonding of the tire directly to the rim was not always an adequate solution to axial slippage.

SUMMARY OF THE INVENTION

The instant invention overcomes and reduces certain disadvantages of the prior known solid rubber tires and achieves certain other advantages including cost savings and reduction of weight by providing a wheel and tire assembly which comprises a mounting disk, a cylindrical rim rigidly affixed to the mounting disk, and cross ribs angularly disposed across the cylindrical surface of the rim. The angled cross ribs are rigidly fastened to the rim surface and are embedded into the solid rubber tire formed therearound so that the solid rubber tire is prevented from circumferential slippage as well as axial slippage on the rim surface. Further, the angularly disposed ribs define a substantially circular profile such that the solid rubber tire is evenly supported entirely around its circumference as it rolls. The uneven bumping associated with previously known bolt heads, lateral rib supports, or lateral U-bolt arrangements is reduced. In this inventive construction, no side rim is required as both circumferential and axial slippage is mechanically prevented due to the unique angular disposition of the ribs.

Another feature of the invention lies in the use of cross ribs which have a rounded top edge along its length such as a bar having a circular cross-sectional shape. The smooth rounded top edge avoids sharp stress rising corners and distributes the compression loading through the rubber tire, thus reducing tearing and cutting actions under repeated high pressure loading. Further, circular angled cross ribs facilitate ease of manufacture as bending of a uniform round bar does not require close attention to maintaining radial orientation as with a rectangular bar.

BRIEF DESCRIPTION OF THE DRAWINGS

These and other objects and advantages will be more fully understood with reference to the specifications, claims and drawings below, in which like reference numerals indicate like elements and in which:

FIG. 1 is a side plan view of a solid rubber tire according to the present invention;

FIG. 2 is a cross-sectional view of a solid rubber tire wheel assembly of FIG. 1 taken along section line 2—2;

FIG. 3 is a perspective partial assembly view of a preferred rim for forming a solid rubber wheel and tire assembly according to the present invention;

DETAILED DESCRIPTION OF THE PREFERRED EMBODIMENTS

Figure 4:
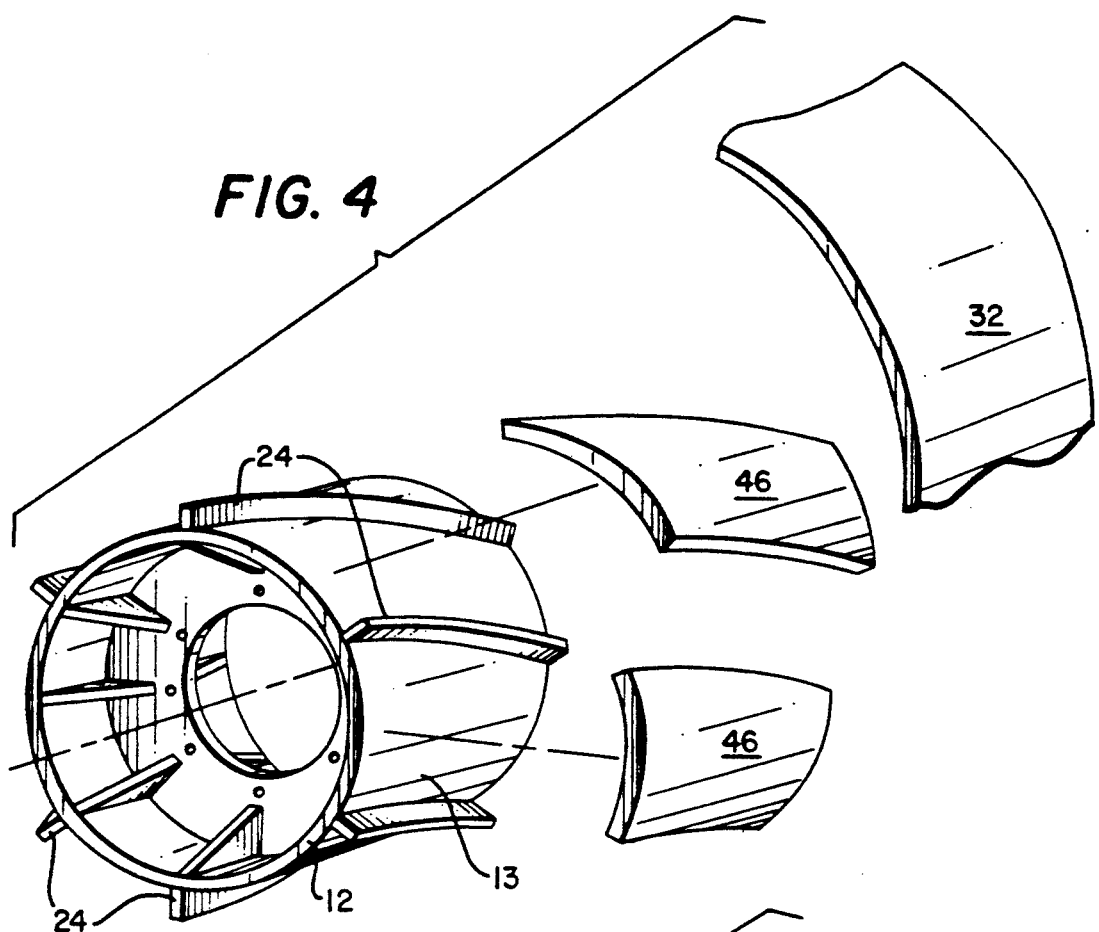
FIG. 4 is a perspective assembly view of an alternative embodiment of a solid rubber wheel and tire assembly.

FIG. 1 is a side plan view of a wheel and solid rubber tire assembly 10. The construction includes a cylindrical wheel rim 12 rigidly fastened to a mounting disk 14 and supported thereabout with support struts 16. Mounting holes 18 are provided circumferentially around a mounting orifice 20, all of which is symmetrically positioned circumferentially around wheel axis 22.

Reference also to FIG. 2, which is a partial cross-sectional view in which a quarter segment of the wheel and solid rubber tire of FIG. 1, taken along section line II—II gives a better understanding of angled cross ribs 24 which are rigidly attached to the surface 13 of cylindrical rim 12 angularly disposed with respect to a radial plane extending from axis 22 through rim surface 13. Preferably as shown, the angled ribs are formed of bars having at least a top edge 40 which has a rounded shape therealong. Particularly preferred are solid bars with a circular cross-sectional shape, each having the same diameter of about ½ to about 2 inches. Ribs 24 are shown positioned at an angle 25, which is shown as a positive counterclockwise angle 25. Preferably, angle 25 forms an angle in a range of between about 30° and 60°. Ribs 24 might also be formed at an opposite angle (i.e., a negative angle or a clockwise angle). Tubular or hollow angled ribs might also be used with some advantage over rectangular ribs because of the rounded top surface and over solid circular bars because of the weight reduction. However, the solid circular bars are preferred as most easily formed into the complex shape of a portion of a spiral, so as to conform at an angle about the radius of the cylindrical wheel rim.

In the preferred embodiment as shown in FIGS. 1, 2 and 3, angled cross ribs 26 are alternatingly interposed between ribs 24 at an angle 27 which is in a direction opposite from angle 25, such as the negative counter-clockwise angle as shown. Preferably, angle 27 corresponds in magnitude to the magnitude of angle 25. The angled cross ribs 24 and 26 preferably are rigidly affixed to cylindrical rim surface 13 and spaced at their ends a short distance from the edges 11 of cylindrical rim 12. Layers of raw rubber having sheet thickness preferably between about ⅜ of an inch to about 1¼ inches are adhered to the cylindrical rim surface 13 of cylindrical rim 12 beginning with on or more base layers 28 formed of segments corresponding to the shape between angled ribs 24 and 26.

In the embodiment shown in FIG. 3, the base layer 28 is composed of truncated cone segments 30 and reverse angled truncated cone segments 31, which are formed and interposed between angled ribs 24 and 26. The number of base layers 28 depends upon the height of the angled cross ribs and the thickness of the rubber so that additional layer forming segments 30 and 31 may be added as required to build the circumference of the base layer 28 of the solid rubber tire equal to the circumference defined by the top edges 40 and 42 of angled ribs 24 and 26, respectively. Subsequently, multiple circumferential layers, such as first circumferential layer 32, as well as second circumferential layer 33 and additional circumferential layers 34 and 35, etc., may be applied one to the next circumferentially around the wheel rim to form a smooth solid rubber tire of a desired diameter.

A rubber-to-metal bonding agent 36 is applied interposed between the surface 13 of cylindrical rim 12 and the base layer 28 formed of truncated cone segments 30 and 31. The rubber-to-metal bonding agent 36 is likewise applied entirely to the exposed surfaces and top edges 40 and 42 of angled ribs 24 and 26. A rubber-to-rubber bonding agent 37 is applied interposed between the separate raw rubber layers. The metal-to-metal bonding agent 36 and the rubber-to-rubber bonding agent 37 are evenly applied as by spraying or other distributing technique. Each raw rubber layer is "sewn" (i.e., mechanically pressed and worked) into each other layer to assist bonding. When a desired diameter tire is built up, the entire solid rubber tire and wheel assembly is placed in a pressurized vulcanization oven to cure the raw rubber and to complete bonding between layers.

Due to the angular relationship of the ribs 24 and 26, the solid rubber tire is prevented from slipping or spinning both in a circumferential direction as well as in an axial direction.

Further, as illustrated with hidden lines in the preferred embodiment of FIG. 1, the top edges 40 and 42 of angled cross ribs 24 and 26, respectively, when viewed in an axial direction project arcs 41 of a circle 43. The ribs are preferably affixed with their respective ends closely spaced as at 45, so that a substantial continuous circular shape 43 is projected into a plan view in the axial direction. Thus, when the wheel is providing rolling support to a vehicle, a consistent thickness and total amount of rubber tire is between the vehicle and the ground substantially all the way around the tire. This provides smooth support to the circumferential rubber layer so that bumping previously associated with high pressure rolling contact with laterally disposed ribs is reduced. Thus, the angled cross ribs provide smooth transition for rolling contact between the wheel and the ground. Wear and tear on the vehicle and on the rubber tire is reduced. Heat build-up and chunking of the solid rubber tire is also reduced because of its smooth operation.

Further, in the preferred embodiment, the top edges of the angled cross ribs are advantageously rounded so that sharp corners of the top edges do not cut into the tire under heavy and repeated loading. Particularly preferred is a circular cross-section ross rib used both to present rounded top edges and to facilitate ease of construction. The rubber tire can fully flex under heavy loading and then return to its normal shape without fatigue, cutting, tearing, or excessive heat buildup at high stress corners.

FIG. 4 depicts an alternative embodiment of angled ribs of a solid rubber tire and wheel assembly in which the angled ribs 24 are provided in a single angular direction. The single angle still prevents direct axial slippage, but in certain extreme conditions might allow the wheel to screw itself out of the tire. Normally, this will not occur because of the rubber-to-metal bonding and also because the vehicle is held against side motion by its other wheels. A rectangular shaped bar forms the angled cross ribs 24. The rectangular shape still has the advantage of smooth rolling contact, but has sharp corners which can be a disadvantage under heavy loading. In this embodiment, rhomboid-shaped segments 46 are interposed and secured to cylindrical surface 13 of cylindrical wheel rim 12 to form the base layer 28 and subsequent circumferential layers 32, etc. are applied to build the tire to the desired diameter.

Figure 5:
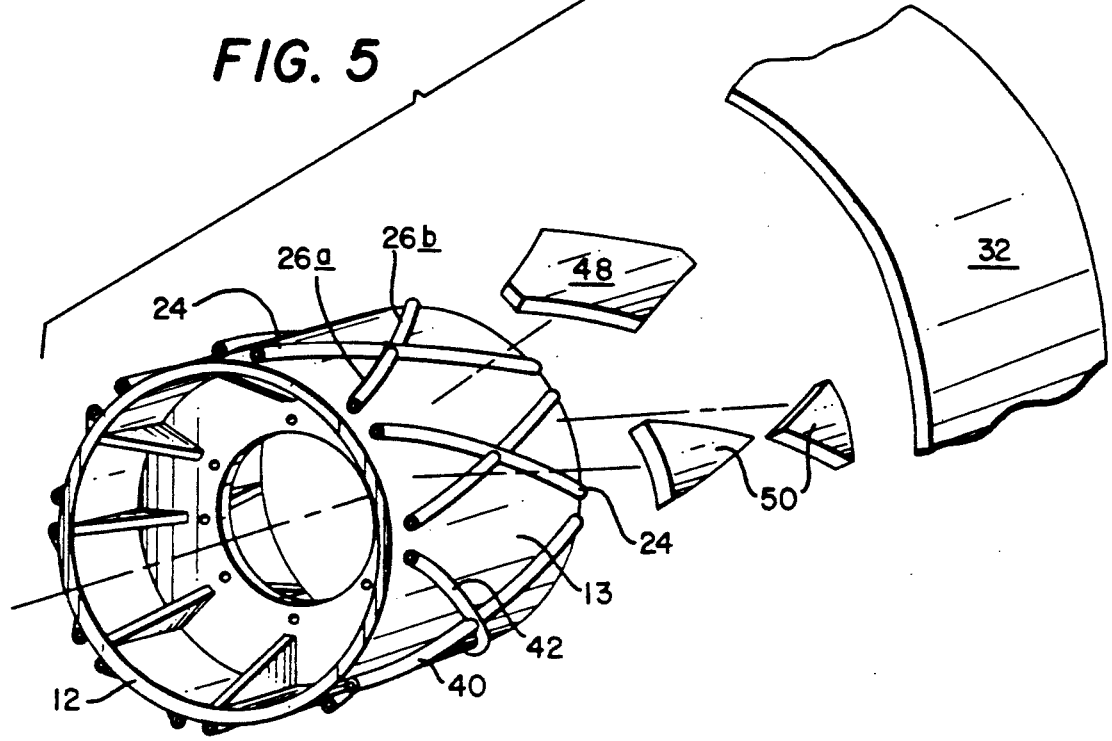
FIG. 5 is a perspective assembly view of yet another embodiment of the solid rubber wheel and tire assembly according to the present invention.

A further alternative embodiment is depicted in FIG. 5. Again, oppositely angled cross ribs 24 and 26 are provided. However, in this embodiment one of the cross ribs 26 is formed from angularly disposed and aligned cross rib portions 26a and 26b on either side of and forming an "X" with respect to angled cross rib 24. The cross ribs 24 and 26 are also shown as tubular bars which can be advantageous for weight saving, although construction may be more difficult. Smooth bending of the tubular bars without crimping is more difficult. Also, trapped air inside the tubes can be a problem unless vented or otherwise eliminated during vulcanization. In this embodiment, substantially diamond-shaped rubber segments 48 and triangular-shaped rubber segment pieces 50 form the base layer 28. After building the diameter of the one or more base layers beyond the upper edges 40 and 42 of ribs 24 and 26, multiple circumferential layers 32, etc., are applied to build the tire to the desired diameter.

Thus, what has been disclosed is a solid rubber wheel and tire assembly with angularly disposed cross ribs, which angularly disposed cross ribs support a solid rubber tire formed thereabout, both against circumferential as well as axial slippage. No side rim is required. Further, the angled cross ribs according to the present invention reduce the bumping previously associated with laterally disposed cross ribs thereby smoothing the ride and reducing wear and chunking in the solid rubber tires under heavy loads.

While the invention has been described in connection with preferred embodiments, it is not intended to limit the scope of the invention to the particular form set forth, but, on the contrary, it is intended to cover such alternatives, modifications, and equivalents as may be included within the spirit and scope of the invention as defined in the appended claims.

What is claimed is:

1. A wheel and solid rubber tire comprising:
   a) a circular mounting disk having an axis perpendicular through the center of said circular mounting disk;
   b) a wheel rim rigidly affixed circumferentially around said circular mounting disk and having a cylindrical surface extending from one end of the rim to another end axially aligned about said axis of said circular mounting disk;
   c) a first plurality of angled cross ribs each having top and bottom edges and rigidly affixed at the bottom edges to said cylindrical surface of said wheel rim substantially continuously thereacross at a positive angle from the one end of the wheel rim to the other end and evenly spaced circumferentially therearound;
   d) a second plurality of angled cross ribs, each having top and bottom edges and rigidly affixed at said bottom edges to said cylindrical surface of said wheel rim substantially continuously thereacross and each interposed between said first plurality of angled cross ribs at a negative angle from one end of the wheel rim to the other end evenly spaced circumferentially therearound;
   d) one or more base layers of even thickness rubber bonded to said cylindrical surface interposed between said angled cross ribs; and
   f) multiple additional layers of even thickness rubber bonded to said one or more base layers with each of the multiple additional layers bonded to a next one of said multiple additional layers so that a solid rubber tire is formed bonded to said wheel rim.

2. The wheel and solid rubber tire of claim 1 wherein the first and second plurality of angled cross ribs are disposed at sufficiently steep positive and negative angles and sufficiently close to each other such that the top edges of said angled cross ribs define a substantially continuous circular shape when viewed in the axial direction.

3. A wheel and solid rubber tire as in claim 1 wherein said angled cross ribs are formed with top edges which are rounded.

4. A wheel and solid rubber tire as in claim 1 wherein said angled cross ribs comprise solid bars having a circular cross-sectional shape.

5. A wheel and solid rubber tire as in claim 1 wherein said angled cross ribs comprise hollow tubes having a circular cross-sectional shape.

6. A wheel and solid rubber tire as in claim 1 wherein:
   a) said first plurality of angularly disposed cross ribs further comprises a first set of bars having circular cross-sections and evenly spaced circumferentially about said wheel rim cylindrical surface and each forming said positive angle with respect to a radial plane projected from said axis of said mounting disk and through said wheel rim; and
   b) said second plurality of angularly disposed cross ribs further comprises a second set of bars having circular cross sections and alternatively interposed between said cross ribs of said first set circumferentially around the rim surface, each forming a negative angle with respect to said radial plane projected from said axis of said mounting disk through said wheel rim.

7. A wheel and solid rubber tire as in claim 6 wherein said first and second alternatingly interposed sets of cross ribs are at sufficiently steep angles and sufficiently closely spaced so that said top edges of said angled cross ribs project arcs of a circle into a plan view in the axial direction which arcs approximate a substantially continuous circular shape in said plan view.

8. A wheel and solid rubber tire as in claim 1 wherein said multiple angled cross ribs comprise first and second sets of cross ribs disposed in opposite directions, such that one set at one angle overlays the other set at an opposite angle to form an "X" on the surface of the cylindrical rim.

9. A wheel and solid rubber tire as in claim 1 wherein the angular cross ribs are disposed at an angle with respect to a plane projected from the axis through the surface of the cylindrical rim which angle is in the range of between about 30° and 60°.

10. A wheel and solid rubber tire as in claim 9 wherein the angle within the range of about 30° to 60° is about 45°.

11. A wheel and solid rubber tire comprising:
   a) a circular mounting disk having an axis perpendicular through the center of said circular mounting disk;
   b) a wheel rim rigidly affixed circumferentially around said circular mounting disk and having a cylindrical surface extending from one end of the rim to another end axially aligned about said axis of said circular mounting disk;
   c) multiple cross ribs having circular rounded cross sections with rounded top edges and having bottom edges rigidly affixed to said cylindrical surface of said wheel rim substantially continuously thereacross and evenly spaced circumferentially therearound;
d) one or more base layers of even thickness rubber bonded to said cylindrical surface interposed between said cross ribs; and
e) multiple additional layers of even thickness rubber bonded to said one or more base layers with each of the multiple additional layers bonded to a next one of said multiple additional layers so that a solid rubber tire is formed bonded to said wheel rim.

12. A wheel and solid rubber tire as in claim 11 wherein said cross ribs having rounded top edges are formed of hollows tubes with a circular cross-section.

* * * * *